United States Patent [19]
Russke et al.

[11] Patent Number: 6,033,012
[45] Date of Patent: Mar. 7, 2000

[54] FOLDING ROOF FOR A MOTOR VEHICLE

[75] Inventors: Klaus Russke; Winfried Bunsmann, both of Bissendorf; Frank Hoffmeister, Osnabrueck, all of Germany

[73] Assignee: Wilhelm Karmann GmbH, Osnabrueck, Germany

[21] Appl. No.: 08/993,557

[22] Filed: Dec. 18, 1997

[30] Foreign Application Priority Data

Dec. 28, 1996 [DE] Germany ............... 296 22 436 U

[51] Int. Cl.[7] .................................................. B60J 7/12
[52] U.S. Cl. ................................. 296/219; 296/107.17
[58] Field of Search ...................... 296/219, 108, 296/107.16, 107.17, 107.19, 107.2

[56] References Cited

U.S. PATENT DOCUMENTS

| | | |
|---|---|---|
| 2,548,105 | 4/1951 | George ............................ 296/107.19 |
| 4,272,121 | 6/1981 | Kim . |
| 4,932,717 | 6/1990 | Swann . |
| 5,054,846 | 10/1991 | Simm et al. ............................ 296/218 |
| 5,823,605 | 10/1998 | Seargeant ............................ 296/219 |

FOREIGN PATENT DOCUMENTS

| | | |
|---|---|---|
| 2699868 | 7/1994 | France .................................. 296/108 |
| 4106493 | 9/1992 | Germany . |
| 173626 | 1/1922 | United Kingdom ................. 296/108 |
| 273894 | 7/1927 | United Kingdom ............. 296/107.19 |
| 329698 | 5/1930 | United Kingdom ................. 296/108 |
| 379144 | 8/1932 | United Kingdom ................. 296/108 |

*Primary Examiner*—Dennis H. Pedder
*Attorney, Agent, or Firm*—Jordan and Hamburg LLP

[57] ABSTRACT

A motor vehicle includes a motor vehicle body having side frames which support a roof area, the roof area including at least two roof panels which lie flat and parallel in the closed position and can be moved to an open position. The roof panels are constructed so that they can be moved by a guiding mechanism from the flat, parallel closed position into a packed open position completely in the interior of the vehicle body at a distance from the roof region and disposed essentially vertically and parallel to one another.

8 Claims, 13 Drawing Sheets

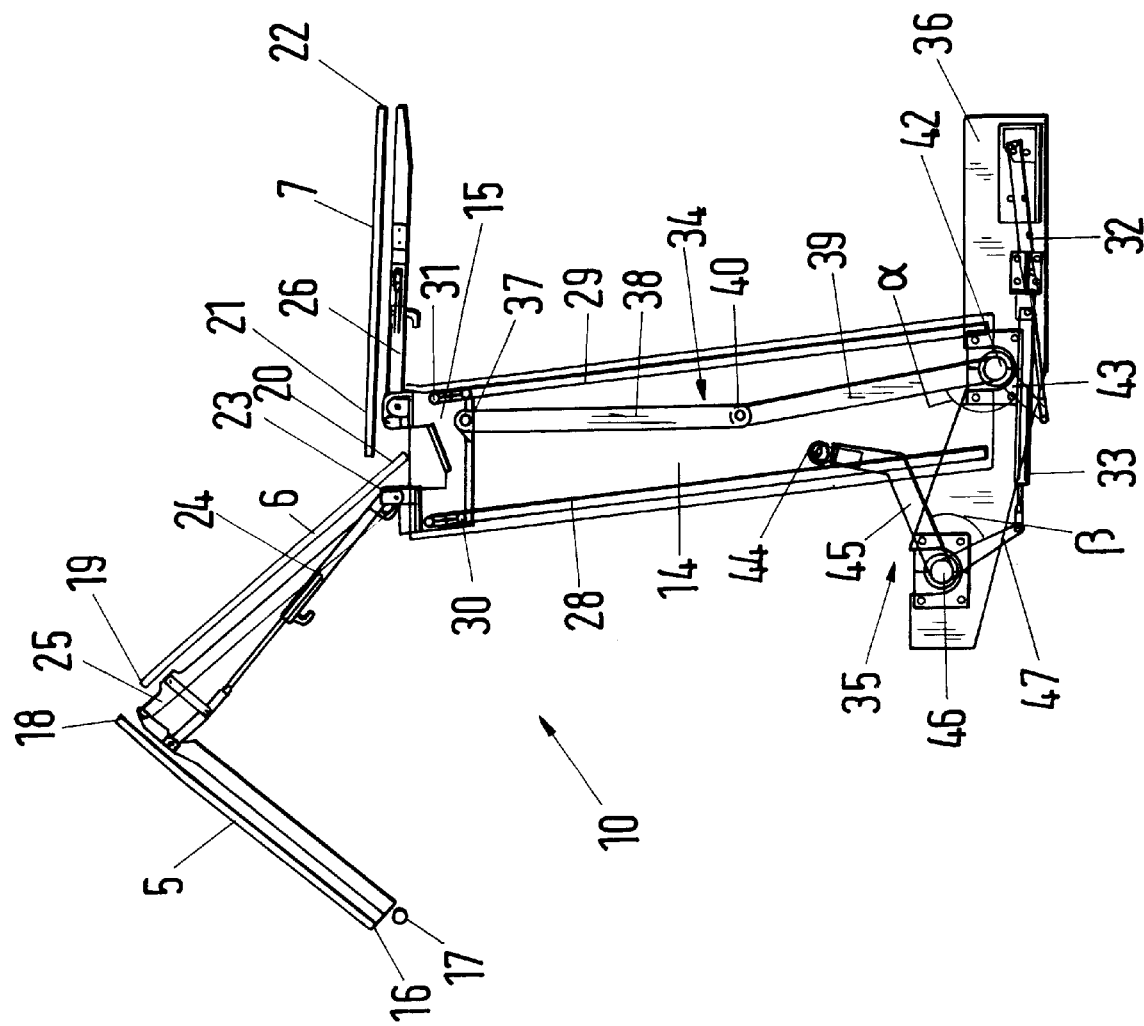
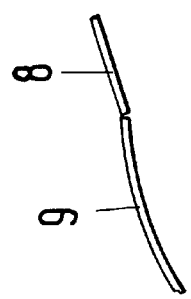
Fig.5

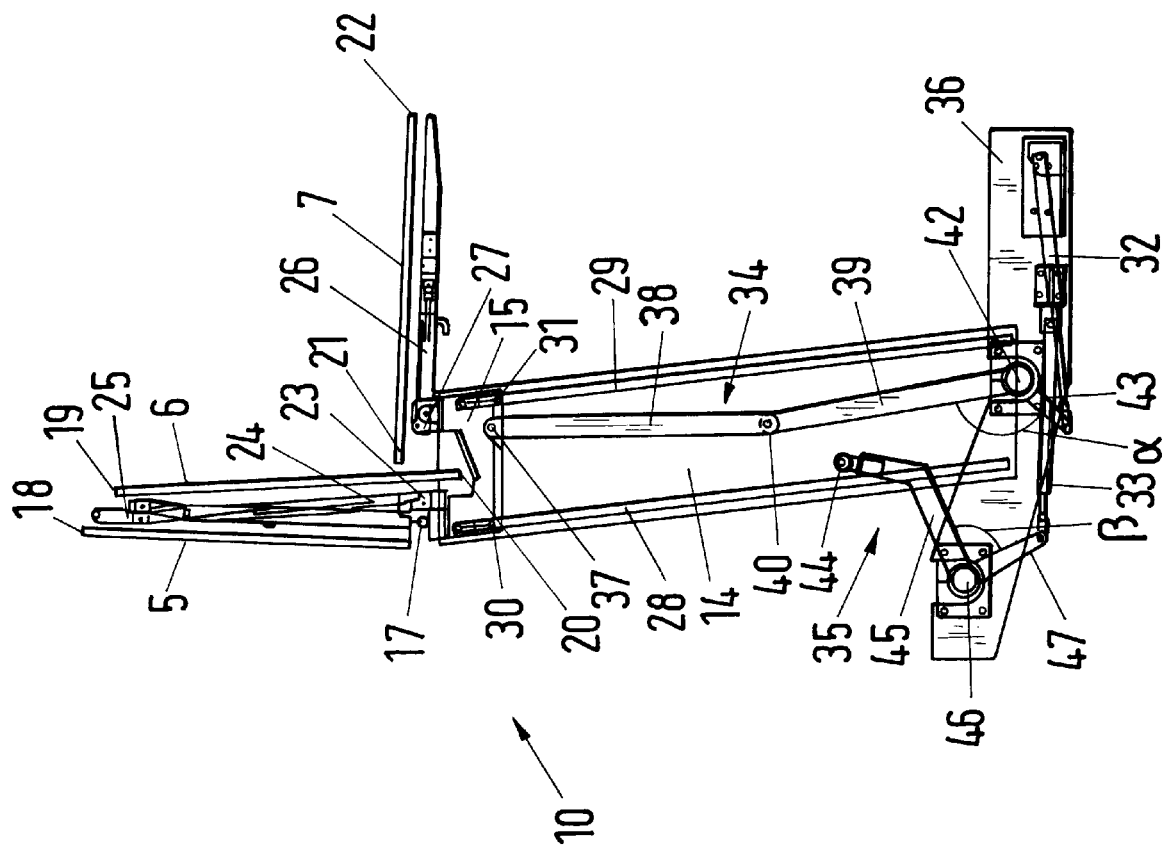
Fig. 7
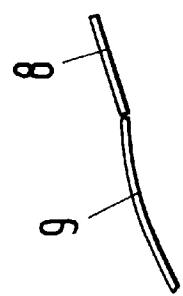

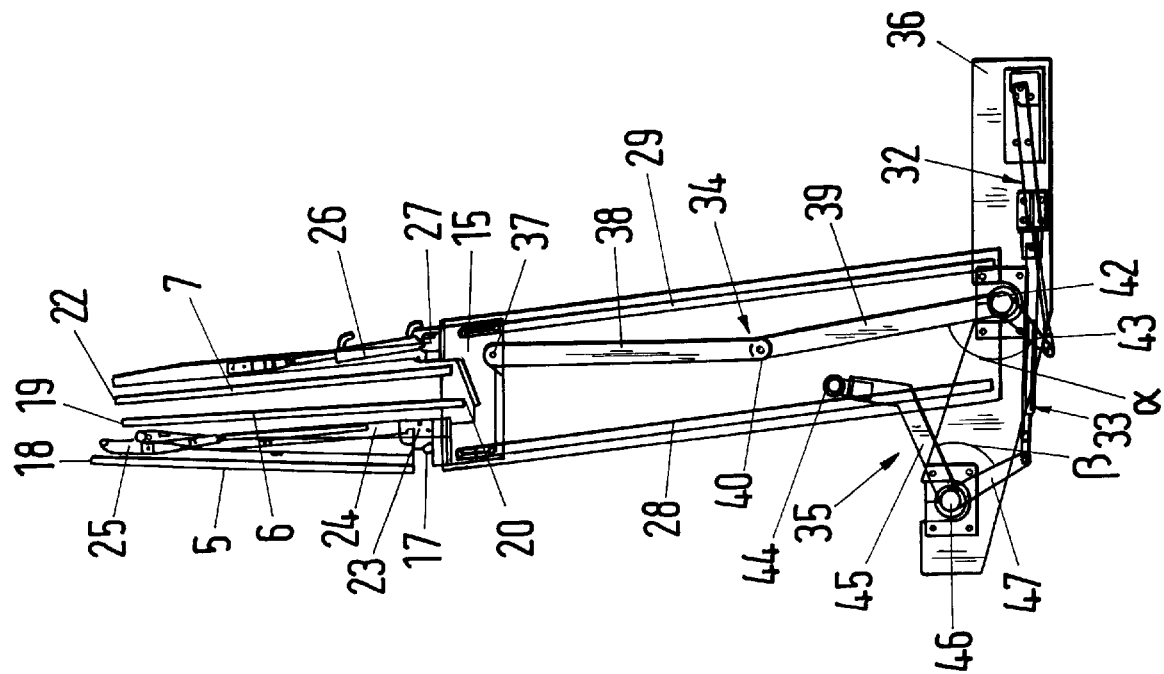
Fig. 10
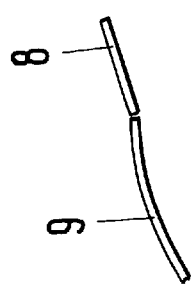

FOLDING ROOF FOR A MOTOR VEHICLE

BACKGROUND OF THE INVENTION

The invention relates to a motor vehicle with a side frame which is attached to the car body and supports a roof area.

DE 41 06 493 C1 discloses a folding roof for occasionally closing off or releasing a roof opening. This folding roof comprises several roof area sections, which are coupled together, hinged to one another and, in the open position, supported on a rear, fixed roof part. This arrangement has the disadvantage that the size of the roof opening is limited owing to the fact that a rear part of the roof must remain to support the opened sections. Moreover, depositing the opened sections of the roof areas on the remaining part of the roof is aerodynamically disadvantageous and exposes parts of the opening mechanism to contamination, which arises while the vehicle is being driven.

SUMMARY OF THE INVENTION

It is an object of the invention to construct a motor vehicle of the initially mentioned type in such a manner, that the largest possible region of the roof area can be opened and moved conveniently into a secure and nonsensitive open position.

By transferring the panel parts, forming at least a portion of the roof area, into a packed position in the interior of the car body, it is achieved that the panel parts, in the open position, are not exposed to the headwind and do not interfere with the aerodynamics of the vehicle.

By developing a guiding mechanism for transferring the panel parts from the flat, parallel, closed position into the open position, a considerable operating convenience is achieved, which ensures a closed path of motion of the respective roof parts in the case of a manual, as well as of a fully automatic operation.

In their packed position, the panel parts preferably are disposed at a distance below the roof region and vertically lying one in front of the other. For this purpose, especially the space behind the seat backs of a row of seats is available, so that a significant encroachment of the interior of the vehicle or of the capacity of the trunk can be avoided. In isolated cases, such as for vehicles with a double bottom, a horizontal packed position of the panel parts, perhaps in the bottom, may also come into consideration. However, such a position requires a great mechanical effort Particularly advantageously, a significant portion of the length of the roof as well as of the width of the roof is taken up by panel parts, so that, after their transfer into the open position, essentially the whole of the roof area—perhaps with the exception of the transverse safety beams, is opened, so that there is a large free space for the passengers. The opening additionally can be enlarged even more if the panel part, facing the rear of the vehicle, adjoins the rear window directly and if the latter is constructed without a frame and can be lowered. The passengers in that case experience a convertible-like feeling of freedom. However, due to the stationary side frames (possibly also connected to one another by transverse beams), they retain the safety cage, to which they are accustomed from a closed vehicle.

Instead of the complete roof, individual parts only of the roof can also be opened so that, for example, the first row of seats remains under a roof, whereas the rear row of seats, perhaps for the tourism sector, is under the roof opening.

Pursuant to an advantageous embodiment of the invention, the panel parts consist of an essentially transparent material, such as Plexiglas, which at the same time has been provided with protection against the sun, for example, in the form of a vapor-deposited metal or the like or with a possibly radiation-sensitive self-toning.

Moreover, it is also possible for individual panel parts to be transparent and others to consist of a sheet (metal or plastic), in order to reduce solar radiation into the vehicle.

Preferably, the guiding mechanism for transferring the panel parts into or out of the open position, is formed by a horizontal guiding system and a main bearing, which can be moved up and down, the roof area comprising three parts, which can be lowered and, for the opening process, initially are swiveled up from the flat parallel position into a vertical packed position and folded against one another and then moved in this vertical packed position along the vertical guides into the interior of the car body. As a result, the possibility arises of attaining the vertical motion of the panel parts over a single main bearing, so that the guiding mechanism can be constructed simply and in a space-saving manner.

Advantageously, a driving mechanism for the main bearing is provided for this purpose and acts over two push-pull rod assemblies on this bearing, an upper part of the vertical movement being brought about essentially by the first push-pull rod assembly and a lower part of at least the upwards movement being brought about by the second.

For this purpose, the two push-pull rod assemblies can be driven in each case by one driving source; in the case of different lever paths, the driving sources can be synchronized by virtue of the fact that, in the lower range of the vertical motion, they are acted upon with the same force. This can be realized in a simple manner, especially when hydraulic cylinders are used—electric motors are, of course, also possible—by a common pressure medium, which acts on both driving sources with the same pressure over the same time. With little mechanical effort and, with that, only a slight encroachment on the interior, such a construction results in high operating convenience for opening and closing the panel parts of the roof of the vehicle.

Further advantages and details of the invention arise out of the drawing and the subsequent description of an example.

In the Drawings

FIG. 1 shows a diagrammatic representation of the inventive motor vehicle with the roof closed, FIG. 2 shows a representation, similar to that of FIG. 1, with a diagrammatically drawn guiding mechanism, FIG. 3 shows a diagrammatic side view of the panel parts and the guiding mechanism in a closed representation, FIG. 4 shows a diagrammatic view of a front and middle panel part, partially swung open, FIG. 5 shows a diagrammatic side view of the movement mechanism and of the panel parts in the movement phase of FIG. 4, FIG. 6 shows a further diagrammatic view of the movement phase of FIG. 4, FIG. 7 shows a diagrammatic side view of the guiding mechanism and of the roof parts, the front panel parts being swung open completely and the rear panel part being in the horizontal position, FIG. 8 shows a diagrammatic representation, in which the two front panel parts are in the vertical position and the rear panel part is partially swung open, FIG. 9 shows a representation, similar to that of FIG. 8, with the rear panel part swung open completely, FIG. 10 shows a diagrammatic side view of the guiding mechanism and of the panel parts in the movement phase of FIG. 9, FIG. 11 shows a view, similar to that of FIG. 10, with the panel parts partially moved downwards, FIG. 12 shows a view, similar to that of FIG. 11, with the panel parts lowered completely, and FIG. 13 shows a diagrammatic view of the movement phase of FIG. 12.

DESCRIPTION OF THE PREFERRED EMBODIMENTS

Figure 1:
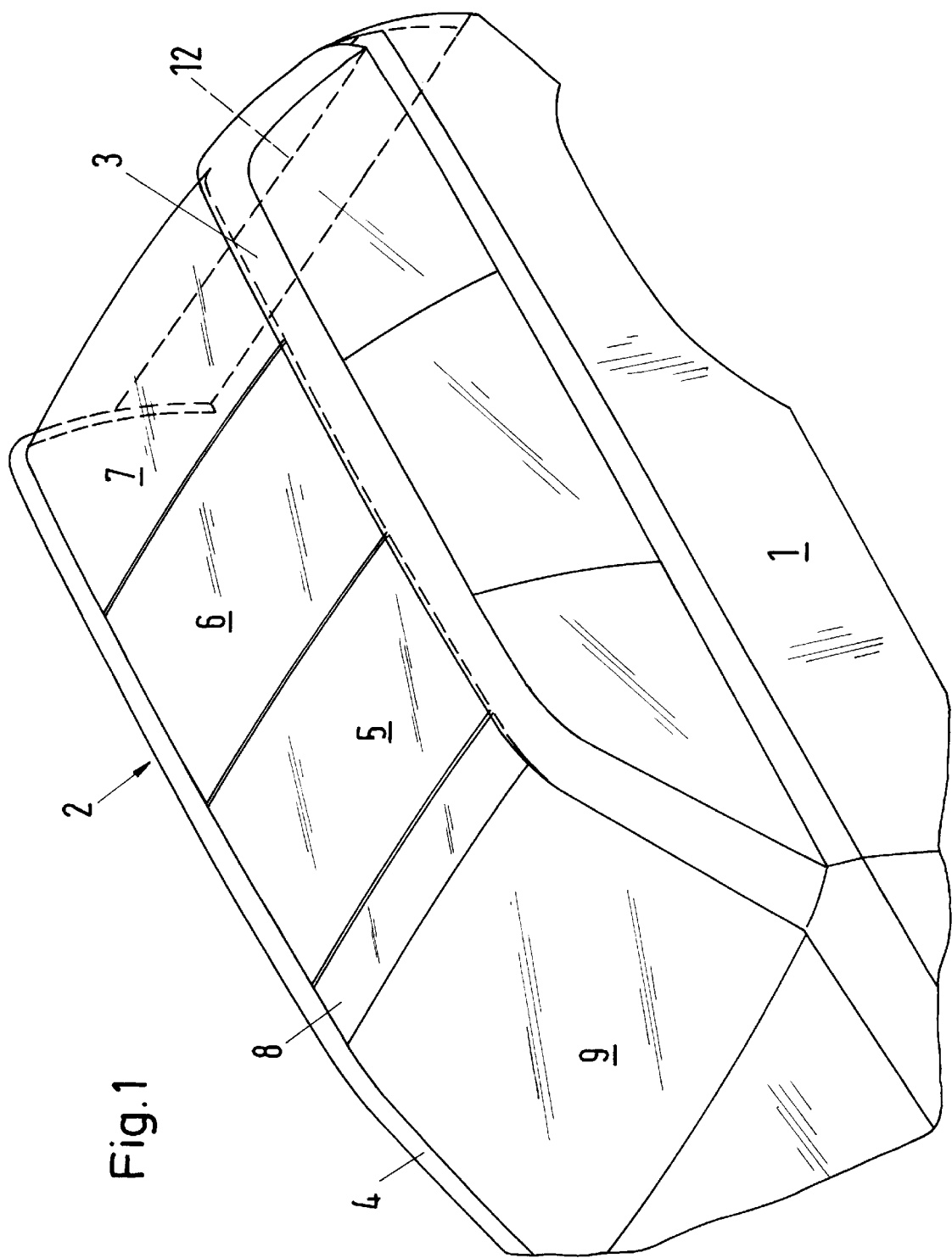
Figure 2:
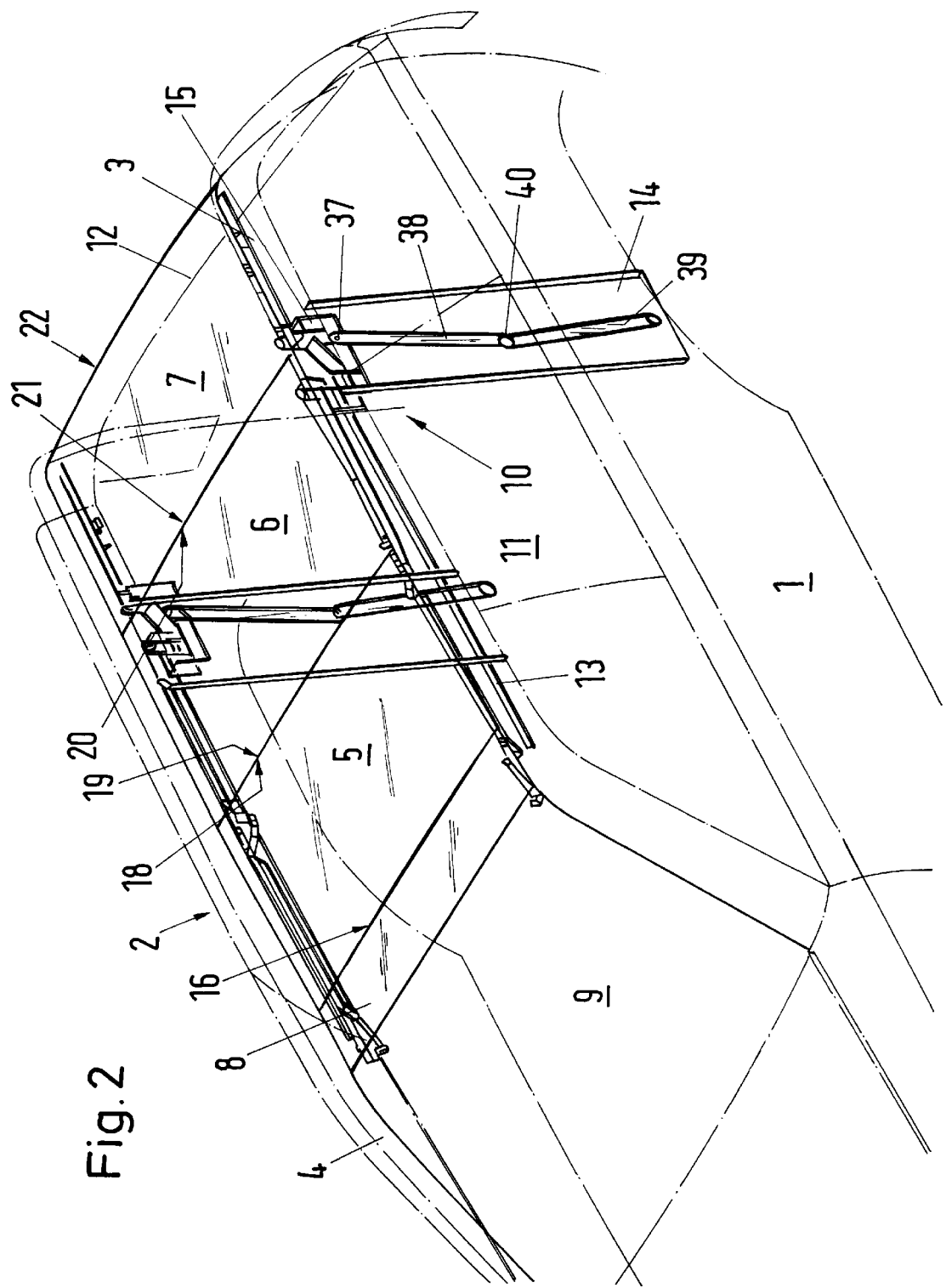
Figure 3:
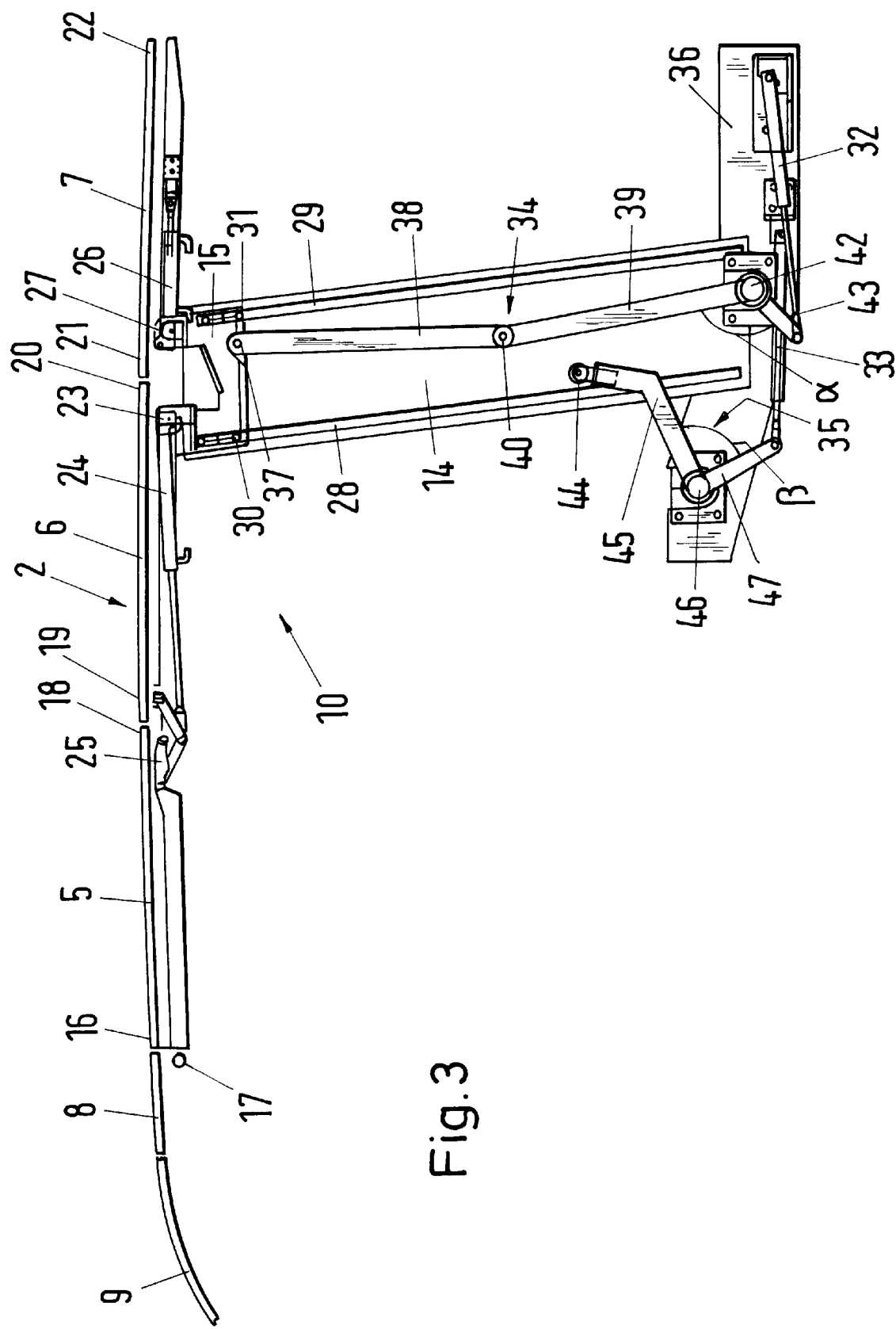
Figure 12:
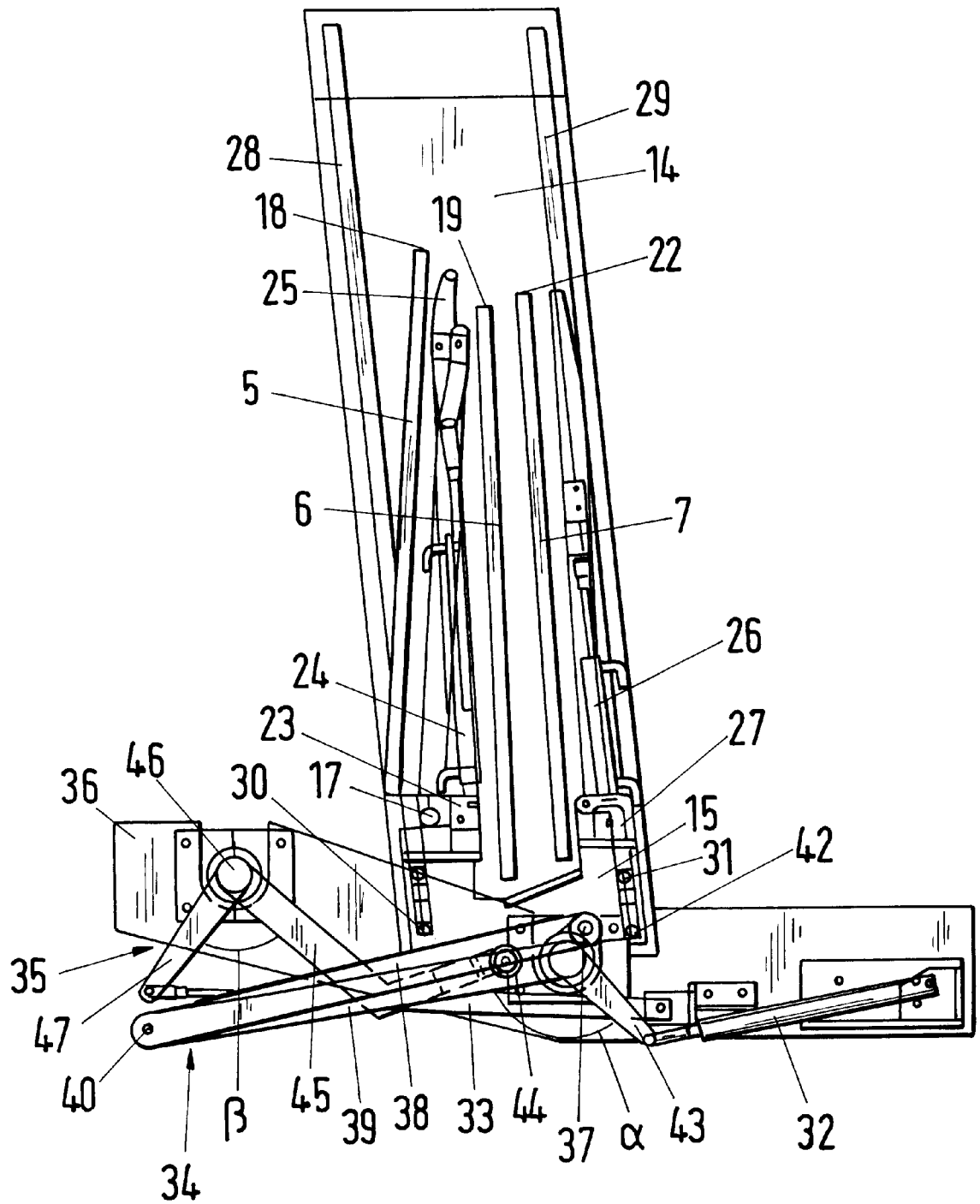
Figure 13:
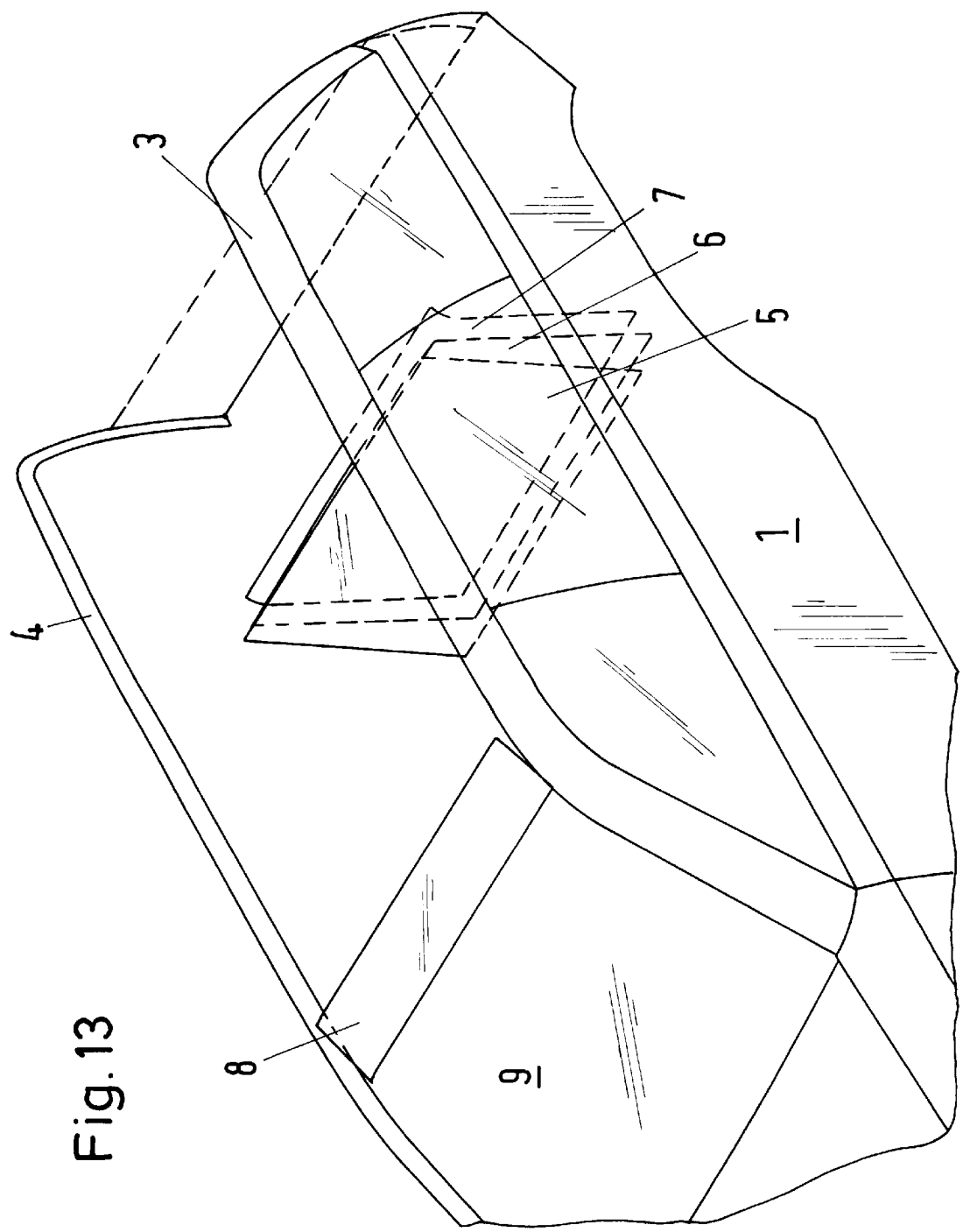

In particular, the vehicle 1 has a roof area 2, which extends between side frames 3 and 4 supporting this roof area 2 and, in the closed position (FIGS. 1 and 2), comprises flat panel parts 5, 6, 7 lying parallel to one another. Ahead of the panel parts 5, 6, 7 in the driving direction, a wind deflector 8 may be disposed, which essentially adjoins the upper edge of the windshield 9, is hinged and can be moved into a tilted position opening towards the rear. The panel parts 5, 6, 7, as a whole, can be moved over a guiding mechanism 10 into a packed position (FIG. 12) in the interior 11 of the car body.

In the present example, the panel parts 5, 6, 7, as well as the wind deflector 8, consist of a transparent material. Especially glass or Plexiglas is available for this purpose. The panel parts 5, 6, 7 then have an additional sun protection, which may consist of a tinting of the panel parts 5, 6, 7 and/or of additional sun protection means, such as shades, which are disposed below the panel parts 5, 6, 7. It is also possible to make the tinting of the panel parts 5, 6, 7 dependent on the intensity of the light being radiated into the vehicle, especially by a silver bromide coating. Vapor deposition or a different form of coating panel parts 5, 6, 7 is provided in every case. The individual panel parts 5, 6, 7 can also be coated differently, for example, in order to keep the driver region cooler than the rear region of the vehicle or in order to be transparent only above the rows of seats.

It is also possible to make all or some of the panel parts (for example, over the trunk or the rear row of seats) of a translucent metal or plastic sheet, in order to limit the radiation of sunlight into the interior 11 of the vehicle by these means. The panel parts 5, 6, 7 can be constructed as deformation elements and, moreover, be connected to the side frames 3 or 4 by suitable means.

Basically, such a roof construction with several panel parts 5, 6, 7, which can be transferred into an open position, comes into consideration especially for vehicles with a long roof area 2, that is, for vans, all-terrain vehicles and combis, as well as for small, bus-like motor vehicles. It is, however, also conceivable for notch-backs vehicles. Vans, large limousines and similar vehicles have the advantage that a large interior 11 is available here for accommodating the panel parts 5, 6, 7 in a packed position.

In the present example, essentially the whole length, as well as the complete width of the roof area 2 between the side frames 3, 4, is occupied by the panel parts 5, 6, 7, which can be transferred into an open position, so that practically complete freeing-up of the roof area 2 is attained in the open position. In deviation from this, it is also possible to provide only partial regions of the roof area 2 with panel parts 5, 6, 7, which can be transferred into the open position, for example, in order to retain a closed driver space and to be able to open up the roof area 2 only above the rear rows. Such vehicles are conceivable, for example, in the tourist sector.

The rear panel part 7 can adjoin a rear transverse part of the roof area 2, which is fixed to the car body and, at the same time, can function as transverse beam and possibly as (partial) covering for the trunk.

The passengers experience the sensation of being in the open air especially when the whole roof area 2 can be opened, which state of affairs is aided when the rear window 12 is constructed without a frame and can be lowered downwards. The open area then extends from the upper edge of the windshield 9 or a wind deflector 8 adjoining thereon up to the lower edge of the rear window 12.

The number of panel parts 5, 6, 7 is variable and depends on the design of the guiding mechanism 10. For example, instead of the three panel parts 5, 6, 7, shown in the example, a larger number of essentially strip-shaped panel parts 5, 6, 7 may also be present, which either bend with respect to one another or push in lamella fashion over one another, in order to attain the open position. In principle, a roof construction with only one or two panel parts 5 is also possible; in the case of one panel part 5, however, such a mechanism for the vertical lowering would represent a disproportionately high construction expense.

In the example, the guiding mechanism 10 comprises a horizontal guide 13, which is assigned to the side frame 3 or 4 and constructed as a guide rail, as well as an essentially vertical guide 14, which guides the lowering of the panel parts 5, 6, 7 into the interior of the vehicle. The guide 14, for example, is integrated into the C column and, by these means, disposed optically unobtrusively and in a space-saving manner.

In order to make this vertical movement possible, the panel parts 5, 6, 7 are connected together and disposed, as a whole, at a main bearing 15, which can be moved up and down in the guide 14. This vertical movement of the main bearing 15 in the guide 14 can take place after the panel parts 5, 6, 7 have been brought into a vertical alignment, the panel parts 5, 6, 7 remaining in the vertical alignment during the up and down movements. The panel parts 5, 6, 7 can have different sizes and shapes. For example, they may be square or rectangular. In particular, however, the panel parts 5, 6, 7 are essentially of the same size so that, when packed one in front of the other, they have approximately the same height extent in the vertical direction.

In the example, a guiding element 17, engaging the guiding rails 13 of the side frames 3 and 4 is assigned to the front transverse edge 16 of the panel part 5, which is the front panel part in the driving direction. On the other hand, this front panel part 5, with its rear transverse edge 18, adjoins the front transverse edge 19 of the middle panel part 6 and the panel parts 5 and 6 are hinged together in such a manner by way of a four joint pivotal connection 25, that they can pivot away from one another in the region of the mutually facing transverse edges 18, 19.

In the region of its rear transverse edge 20, the middle panel part 6 is hinged to the main bearing 15, so that it can be swiveled upwards with respect to this in a swiveling angle opening up in the driving direction.

On the other hand, the rear panel part 7 is hinged with its front transverse edge 21 at the main bearing 15 and can therefore be swiveled up in the opposite direction to the middle panel part 6.

It is also possible that the rear transverse edge 22 of the rear panel part is hinged to the rear window 12 in much the same way as the panel part 5 is hinged to the middle panel part 6. In that case, however, the rear window 12, which hangs from the rear panel part 7, would have to be moved into the interior 11 of the vehicle, in order to attain the open position and, as a result, the overall dimensions of the package, with the parts brought into the packed position, would have to be enlarged. The rear window 12 is therefore constructed as a part, which is independent of the panel parts 5, 6, 7 and can be lowered downward into the tailgate.

Figure 4:
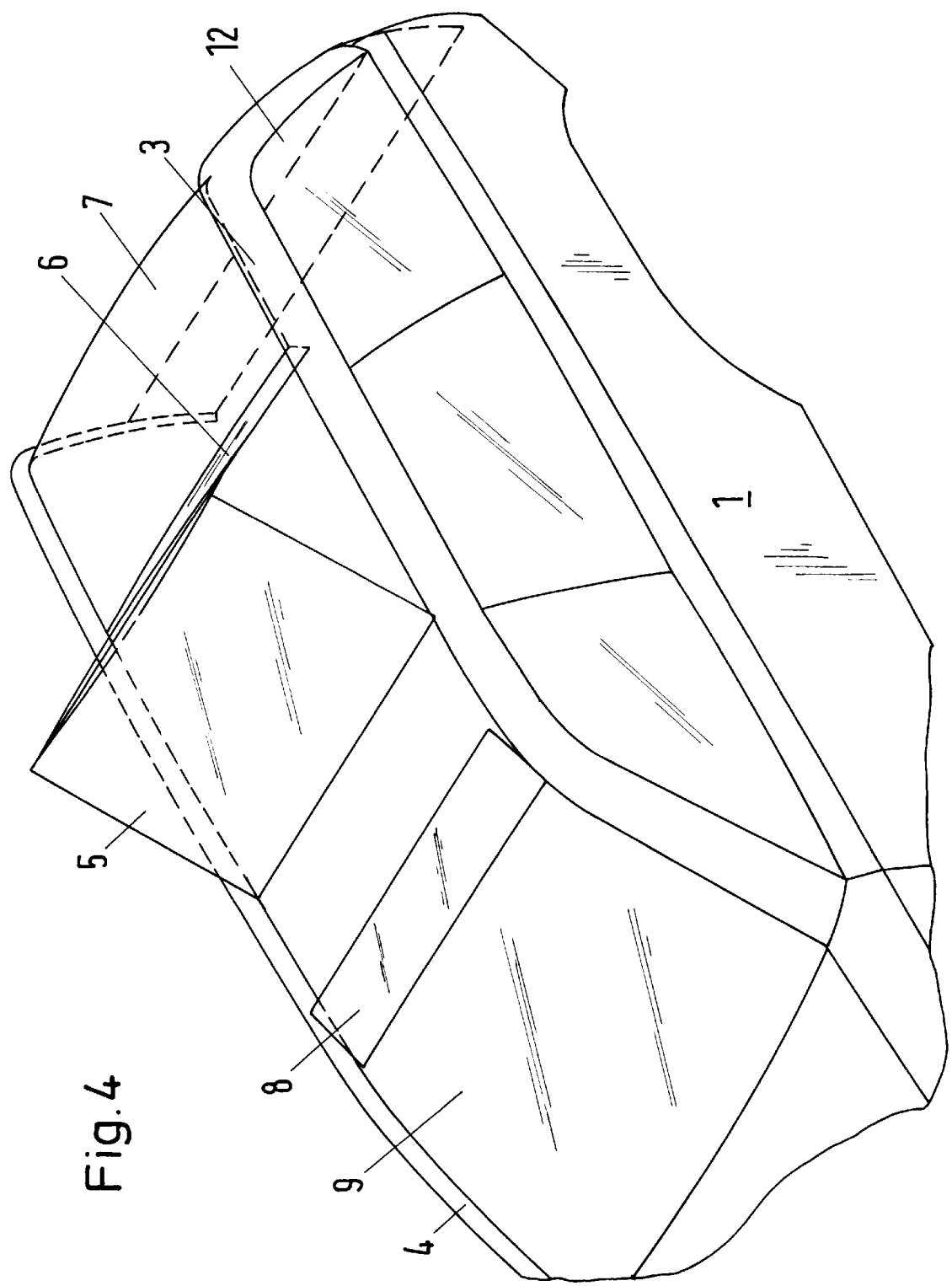
Figure 6:
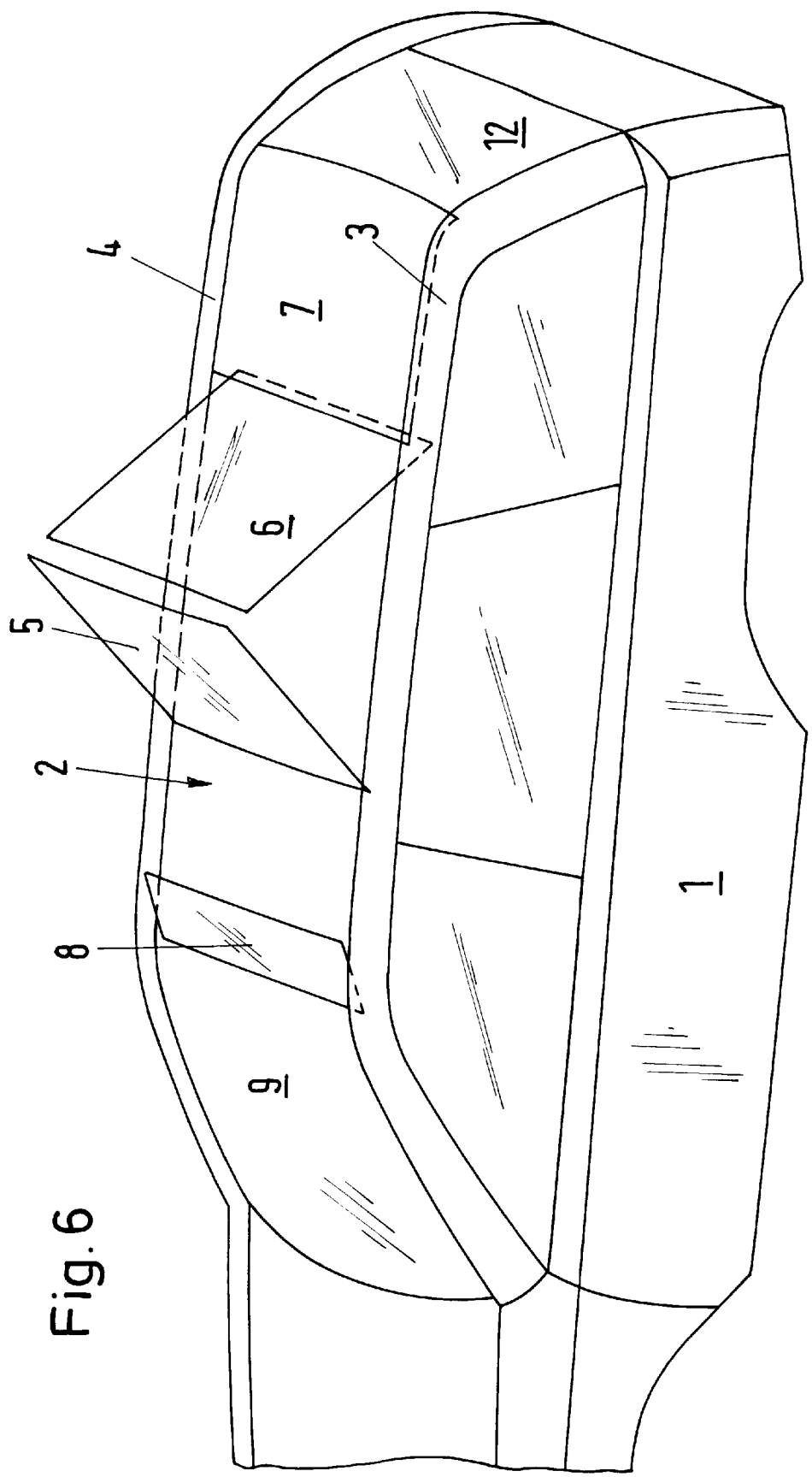
Figure 8:
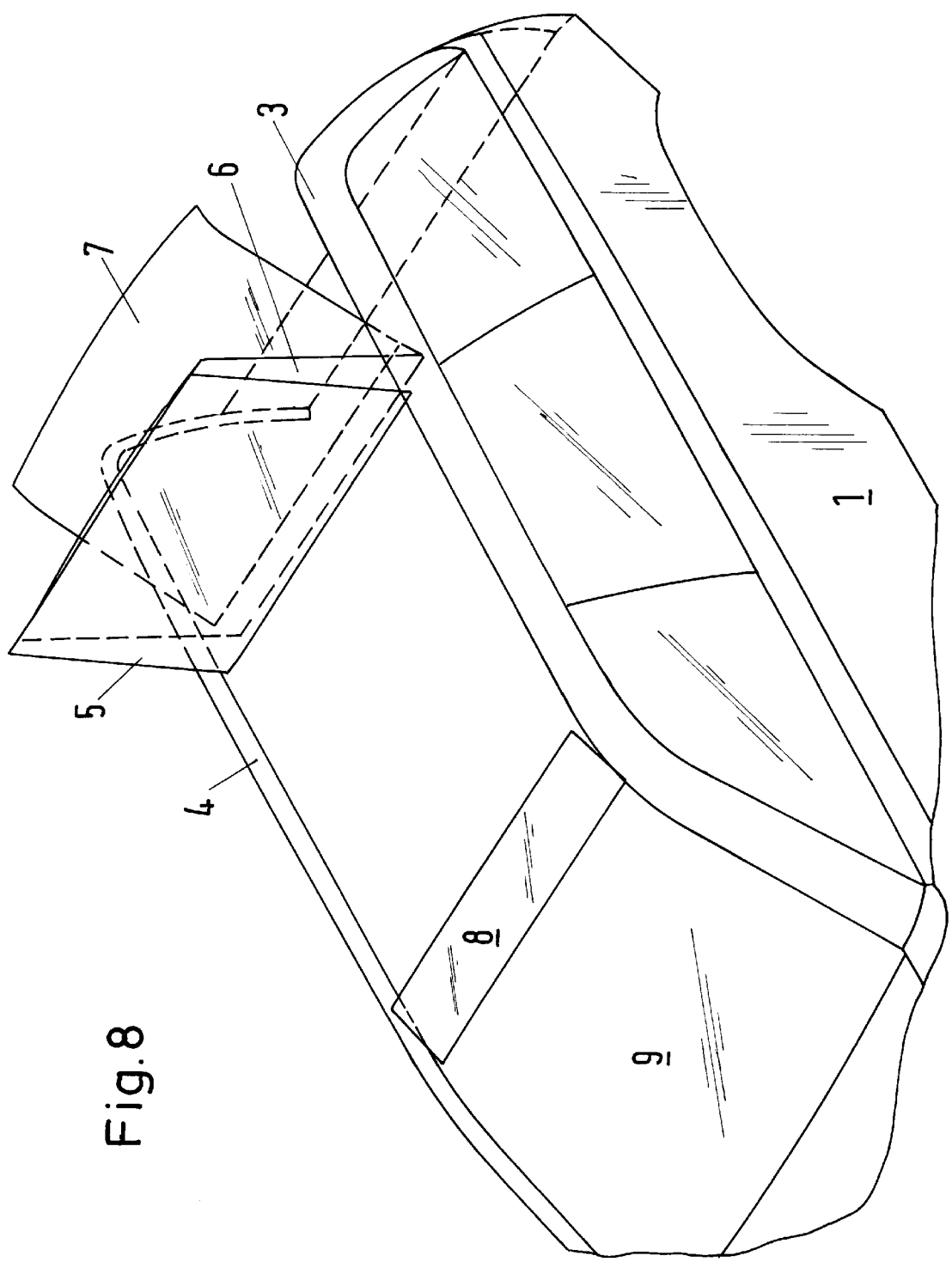

To open the panel parts 5, 6, 7 forming the roof area 2, initially the middle panel part 6 is swiveled about its joint 23 at the main bearing 15 into an angle opening up in the driving direction. For this purpose, there is a driving mechanism, for example, a hydraulic cylinder 24, which is connected in the region of the transverse edges 18, 19 between the front panel part 5 and the middle panel part 6 at one end with the joint 23 and at the other end with the four joint pivotal connection 25. The hydraulic cylinder 24 exerts its pulling movement on the four joint pivotal connection 25, as a result of which, on the one hand, the panels 5 and 6 are pivoted towards one another and, on the other, the front panel part 5 is moved over its guiding element 17 in the lateral guide rail 13 towards the rear (FIGS. 4 to 6). The end position is reached when the guiding element 17 is moved so far horizontally towards the rear, that it is in the region of the main bearing 15 and, with that, adjacent to the joint 23. The panel parts 5, 6 are then in an almost vertical position (FIGS. 7 to 10).

Figure 9:
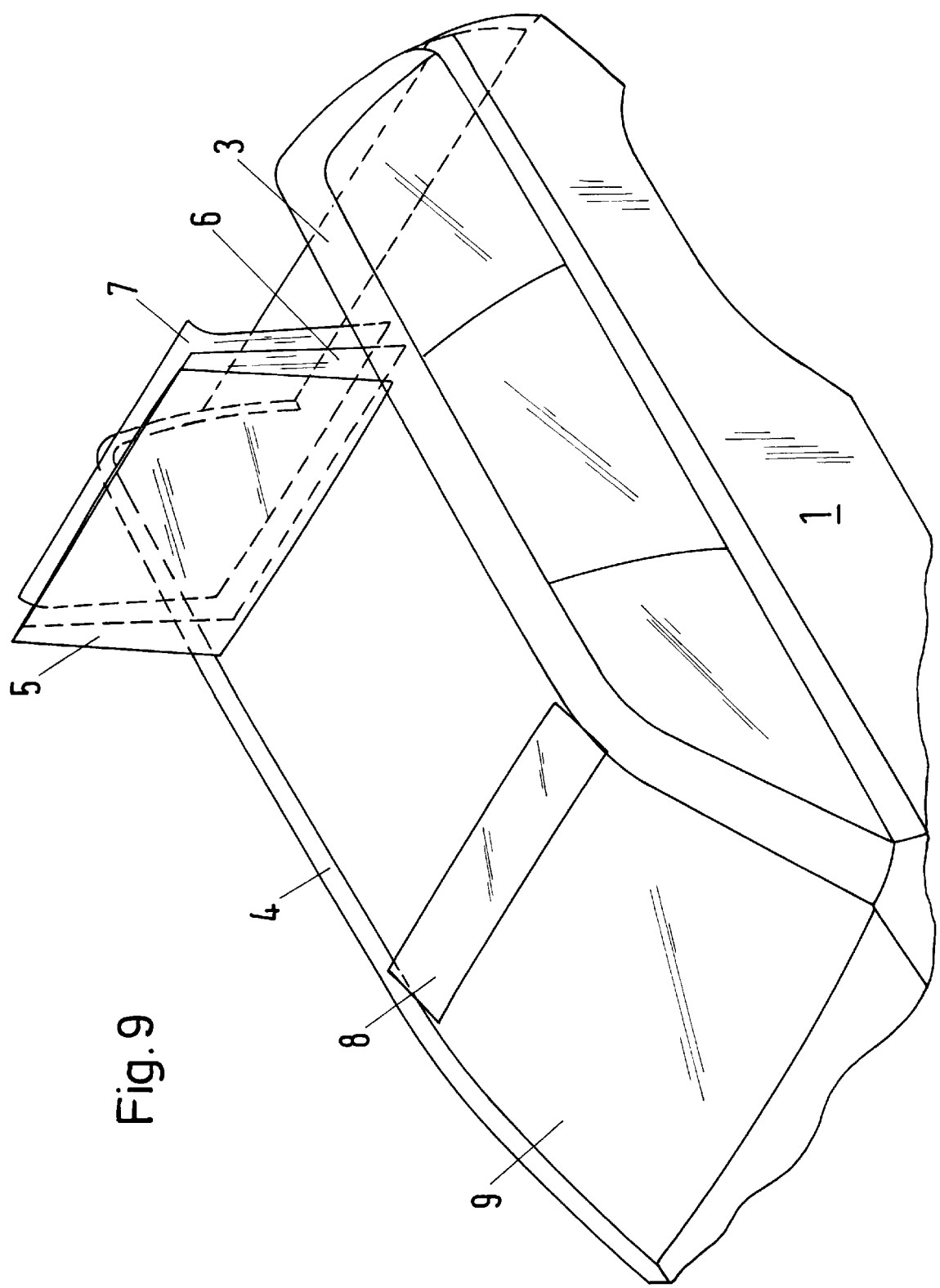

During this swiveling motion of the front panel parts 5, 6, the rear panel part 7 can remain in the horizontal position, as shown in FIG. 7, particularly in order to avoid mutual interference in the region of the transverse edges 20, 21 of the panel parts 6, 7. If the swiveling motion of the panel parts 6, 7 is designed appropriately, the latter can also, however, be swiveled simultaneously. The panel part 7 and the panel part 6 swivel in opposite directions, for which purpose a driving mechanism, such as a hydraulic cylinder 26, links the joint 27, disposed on the main bearing, with a central or rear region of the panel part 7. When the hydraulic cylinder 26 is extended, the panel part 7 is swiveled up at the same time (FIG. 8), until it reaches its fully swiveled-up end position in a vertical packed position approximately parallel to the swiveled-up panel parts 5, 6 (FIGS. 9 and 10).

This end position corresponds to the packed position in the interior 11 of the vehicle, so that the transfer of the panel parts 5, 6, 7 into the interior 11 of the vehicle takes place already in this packed position. As a result, the interior space is not limited unnecessarily during the execution of the movement, for example, owing to the fact that initially the panels 5, 6, 7 are swiveled into the interior, the head space thus being reduced temporarily. Of course, other solutions are also conceivable, for which the panel parts 5, 6, 7 are moved into the interior 11 of the vehicle either consecutively or also simultaneously, without previously having to be brought into the vertical packed position.

For the downwards movement of the main bearing, which is connected over the joints 23 and 27 with the panel parts 5, 6, 7, this main bearing is guided in the vertical guide 14 over guiding paths 28 and 29, which the main bearing 15 engages with rollers 30 and 31.

For the downwards and upwards motions of the main bearing 15 and of the panel parts 5, 6, 7 connected therewith, driving mechanisms 32 and 33 are disposed in the lower region of the vehicle at a frame part 36. These driving mechanisms 32 and 33 transfer their motive power over push-pull rod assemblies 34, 35 to the main bearing 15. In order to keep the structural dimensions of the driving mechanisms 32, 33, as well as of the transfer elements 34, 35, small, two driving mechanisms 32, 33 are constructed, which bring about different phases of the vertical motion of the main bearing 15.

It is of course also possible to drive both push-pull rod assemblies over a common driving mechanism 32 or to use only one push-pull rod assembly. The driving mechanisms 32, 33 can be constructed in different known ways, for example, as an electric motor or motors or as a hydraulic cylinder or cylinders.

In the upper starting position (FIG. 10) of the main bearing 15, the latter engages only the push-pull rod assembly 34, which is driven by the driving mechanism constructed in the example as a hydraulic cylinder. For this purpose, an upper lever 38 of the push-pull rod assembly 34 at an articulated axle 37 is hinged to the main bearing 15, which is connected over a knuckle joint 40 with the lower lever 39, which is held at its lower end in the joint 42, which is supported immovably with respect to the frame 36 and, with that, to the car body. A short actuating lever 43 is connected over this joint 42 with the lower lever 39, the actuating lever 43 being disposed immovably with respect to the lever 39, so that the angle $\alpha$ between the lower lever 39 and the actuating lever 43 remains constant. The driving mechanism 32 engages the actuating lever 43.

Figure 11:
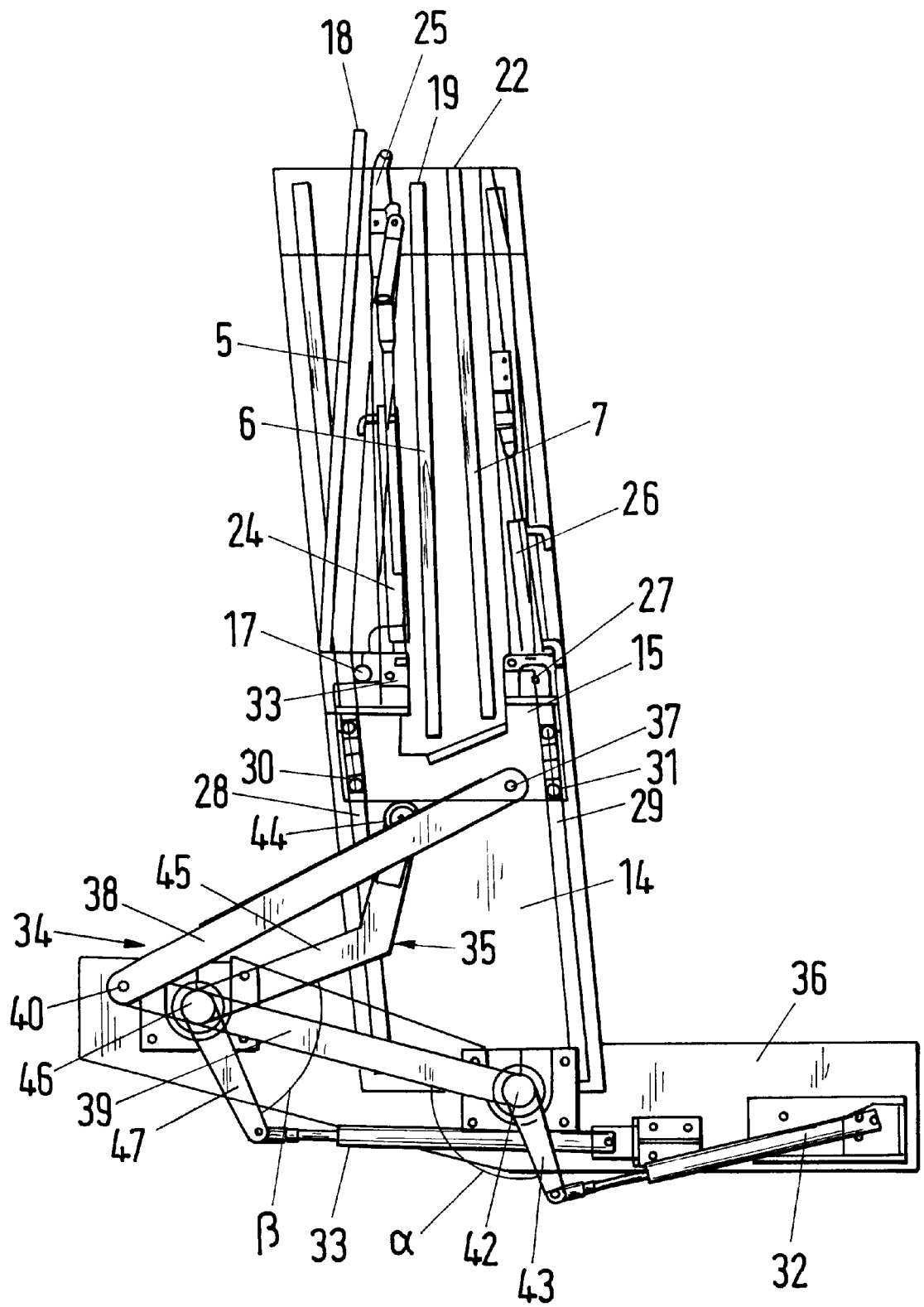

The actuating lever 43 is therefore swiveled by a pulling motion of the driving mechanism 32 in the counter-clockwise direction as seen in side view from the left side of the vehicle (FIG. 11), so that the lower lever 39 of the push-pull rod assembly 34 also is swiveled counter-clockwise and the knuckle joint 40 is bent, as a result of which the upper lever 38 is also bent and, over its articulated axle 37, pulls the main bearing 15 downwards in the guiding paths 28 and 29. This downwards pull may consist essentially of applying a pressure directed against the force of the weight of the main bearing 15 with the panel parts 5, 6, 7, in order to decelerate the downwards motion brought about by the force of the weight In the course of the downwards motion, the main bearing 15 with the panel parts 5, 6, 7 attains engagement with the second push-pull rod assembly 35, which is closed at the top by a guide roller 44, which adjoins the transfer lever 45 of the second push-pull rod assembly 35. This transfer lever 45 is held in a bearing 46, which is also stationary with respect to the frame 36 and at which an actuating lever 47 is also hinged, which connects the push-pull rod assembly 35 with the driving mechanism 33. This actuating lever 47 is at a fixed angle $\beta$ to the transfer lever 45. This angle does not change even during the swiveling motion of the levers 45, 47 about the bearing 46.

During the downwards motion, the main bearing 15 exerts a pressure on the guide rollers 44, as a result of which the transfer lever 45 is swiveled about the main bearing 46 in the clockwise direction, as viewed from the left side of the vehicle, and, at the same time, swivels the actuating lever 47, which is fixed with respect to the main bearing 46. As a result, the driving mechanism 33, constructed as a hydraulic cylinder, is extended.

In the lower dead center position of the main bearing 15 (FIG. 12), the driving mechanism 32 is in the retracted position and the driving mechanism 33 is in the extended position. In order to bring about the upwards motion of the main bearing 15 with the panel parts 5, 6, 7 out of the interior 11 of the vehicle from this position, a very large force would have to be provided by the driving mechanism 32 in order to swivel apart the two levers 38 and 39, which are almost parallel to one another in this lower dead center position, about the knuckle joint 40.

In order to avoid this, the second driving mechanism 33 is installed with the second push-pull rod assembly 35 and develops very favorable lever ratios in the lower region of the vertical upwards motion of the main bearing 15. In the lower region of the vertical motion, this driving mechanism 33 therefore supports the driving mechanism 32 and is synchronized with it.

In order to bring about the vertical upwards motion of the main bearing 15 from the lower dead center position, the hydraulic cylinder 32 is actuated in the extending direction and the hydraulic cylinder 33 in the retracting position. At the same time, synchronization is developed so that pressure medium under the same pressure acts on the two hydraulic cylinders for the same time period, so that the hydraulic cylinders exert the same force. Due to the different torques about the bearings 42 and 46 and due to the different kinematics of the push-pull rod assemblies 34 and 35, an identical vertical path of the guide roller 44 and the articulated axle 37 results at the main bearing 15, so that both driving sources 32, 33 support the upwards motion of the main bearing 15 and a force division therefore takes place.

When the hydraulic cylinder 33 is retracted, the actuating lever 47 is swiveled in the counter clockwise direction, so that the transfer lever 45, which is offset relative to the actuating lever 47 by the constant angle β, is swiveled about the bearing 46 also in the counter clockwise direction, as a result of which the guide roller 44, supporting the bottom region of the main bearing 15, is actuated in the sense of an upwards swiveling. At the same time, the main cylinder 32 is extended and transfers a thrusting force on the actuating lever 43, as a result of which the latter is swiveled clockwise above the bearing 42 and, at the same time, swivels the lower lever 39, which is disposed rigidly by the angle α with respect to this actuating lever 43, also in the clockwise direction. Due to this swiveling of the lower lever 39 in the clockwise direction, the knuckle joint 40 is also swiveled and, as a result, the articulated axle 37 of the lever 38 in the main bearing 15, because of the forced guidance of the main bearing 15, is moved in the guides 28 and 29 in the sense of an upwards motion. As already mentioned, the efficiency, which results from the transmission of power by the driving mechanism 32 in this phase of the motion, is very slight since, because of the almost parallel position of the levers 38 and 39, essentially only a sideways directed force of the articulated axle 37 results from the torque about the bearing 42. Only as the levers 38 and 39 are propped open further about the knuckle joint 40, do the vertical components of the force on the articulated axle 37 move into the foreground. In this lower region of the vertical motion of the main bearing 15, the force, exerted by the second push-pull rod assembly 35 over the driving mechanism 33, is therefore determining.

Due to this two-lever construction, the size of the frame 36, lying against the respective side of the vehicle, can be kept small. On the other hand, a not excessive force for actuating upwards movement of the panel parts 5, 6, 7 is attained, so that this upwards movement can be carried out rapidly, as may be necessary in the event of a suddenly developing rain shower.

Aside from the arrangement of the guiding mechanism 10 shown here, numerous other versions are also conceivable. In the present example, the panel parts are moved completely automatically. Manual actuation is also conceivable, especially when the panel parts 5, 6, 7 are constructed from plastic and therefore are light in weight. Instead of hydraulic cylinders, electric motors also, of course, come into consideration for use with the driving mechanism.

In order to put away the panel parts 5, 6, 7 behind the front row of seats and, as a result, retain especially the full length of the trunk space when the rear row of seats is dismantled, a reverse arrangement of the panel parts 5, 6, 7 and of the guiding mechanism 10 is possible, so that the vertical guide 14 is between the two front panel parts and, as a result, the panel parts 5, 6, 7 would be put away directly behind the front seats.

It is also conceivable to put away the panel parts 5, 6, 7 as a whole in the rear region and, at the same time, to utilize the tailgate as space for accommodating the packed position. This comes into consideration particularly for lamellar panel parts 5, 6, 7, which can then be lowered in the form of venetian blinds along a guide into the tailgate. However, the present arrangement has the advantage that the panel parts 5, 6, 7 are stowed away securely and immovably in the packed position behind the backs of a row of seats, only very little trunk depth being lost by this package. The seating comfort for the passengers is also fully retained.

By putting away the panel parts 5, 6, 7 at a distance from the roof of the vehicle, unrestricted vision towards the rear is retained in every case.

For certain requirements, it may be desirable to develop several individual mechanisms for moving the panel parts 5, 6, 7 into the interior 11 of the vehicle, so that, as required, either individual or several or all panel parts 5, 6, 7 can be moved into the open position.

What we claim is:

1. A roof assembly for a motor vehicle having a vehicle body with side frames comprising a paneled roof having at least two roof panels, said roof panels having a closed position in which the roof panels are contiguous to one another, a guide mechanism mounted on the vehicle body for moving said roof panels from said closed position to a stored position in which the roof panels are displaced from the closed position and are disposed in the vehicle body substantially vertical and parallel to one another, said guide mechanism including generally vertical guides mounted on said vehicle body, a main bearing movably vertically along said vertical guides, a first pivot means pivotably connecting one of said roof panels to said main bearing, said main bearing having a lowered position, said main bearing when in said lowered position positioning said roof panels in said stored position, and a second pivot means pivotably connecting another of said roof panels to said main bearing.

2. A roof assembly for a motor vehicle having a vehicle body with side frames comprising a paneled roof having at least two roof panels, said roof panels having a closed position in which the roof panels are contiguous to one another, a guide mechanism mounted on the vehicle body for moving said roof panels from said closed position to a stored position in which the roof panels are displaced from the closed position and are disposed in the vehicle body substantially vertical and parallel to one another, said guide mechanism including generally vertical guides mounted on said motor vehicle, a main bearing moveable along said vertical guides between an upper position and a lowered position, connecting means pivotably connecting said paneled roof to said main bearing, a first drive unit for vertically moving said main bearing in said vertical guides, said main bearing having an intermediate position between said upper position and said lowered position, and a second drive unit for vertically moving said main bearing from said lowered position to said intermediate position.

3. A roof assembly for a motor vehicle having a vehicle body with side frames comprising a paneled roof having at least two roof panels, said roof panels having a closed position in which the roof panels are contiguous to one another, a guide mechanism mounted on the vehicle body for moving said roof panels from said closed position to a stored position in which the roof panels are displaced from the closed position and are disposed in the vehicle body substantially vertical and parallel to one another, said guide mechanism including a main bearing moveable from an upper position to a lowered position, said main bearing being in said lowered position when said paneled roof is in said stored position, said paneled roof including a front, intermediate and rear roof panel, said intermediate roof panel having a rear edge portion, said rear roof panel having a front edge portion, first pivot means pivotably supporting said rear edge portion of said intermediate panel on said main bearing, and second pivot means pivotably supporting said front edge portion of said rear roof panel on said main bearing.

4. A roof assembly according to claim 2 wherein said first and second drive units are in synchronism with one another when moving said main bearing from said lowered position to said intermediate position.

5. A roof assembly according to claim 2 wherein said first and second drive units each include hydraulic power devices which are acted upon by the same hydraulic pressure and for the same length of time for moving said main bearing from said lowered position to said intermediate position.

6. A roof assembly according to claim 3 wherein each of said front and intermediate roof panels are in a generally horizontal disposition when in said closed position, hinge means pivotably connecting said intermediate roof panel and said front roof panel, said guide mechanism being operable to pivot said intermediate and front panel from said generally horizontal disposition to a generally vertical disposition as said intermediate roof panel and front roof panel pivot relative to one another at said hinge means, generally horizontal first guide parts on said side frames, said front roof panel having a front edge portion having second guide parts guided in said first guide parts when said intermediate and front roof panels pivot from said horizontal to said vertical disposition.

7. A roof assembly according to claim 6 further comprising power drive means connected between said main bearing and said hinge means for pivoting said front and intermediate roof panels from said horizontal disposition to said vertical disposition.

8. A roof assembly according to claim 6 further comprising power drive means connected between said main bearing and said rear roof panel for pivoting said rear roof panel about said second pivot means from said horizontal disposition to a generally vertical disposition.

* * * * *